United States Patent
Xu et al.

(10) Patent No.: US 9,118,677 B2
(45) Date of Patent: Aug. 25, 2015

(54) META-APP TO DEPICT CLOUD ENVIRONMENT DEPENDENCIES TO FACILITATE A SERVICE ENVIRONMENT REBUILD

(75) Inventors: Shijie Xu, Beijing (CN); Xuefeng Song, Habei (CN)

(73) Assignee: Empire Technology Development LLC, Wilmington, DE (US)

( * ) Notice: Subject to any disclaimer, the term of this patent is extended or adjusted under 35 U.S.C. 154(b) by 38 days.

(21) Appl. No.: 14/007,547

(22) PCT Filed: May 10, 2012

(86) PCT No.: PCT/CN2012/075284
§ 371 (c)(1),
(2), (4) Date: Sep. 25, 2013

(87) PCT Pub. No.: WO2013/166682
PCT Pub. Date: Nov. 14, 2013

(65) Prior Publication Data
US 2014/0351372 A1    Nov. 27, 2014

(51) Int. Cl.
*G06F 15/16* (2006.01)
*H04L 29/08* (2006.01)
*G06F 9/48* (2006.01)
*G06F 9/445* (2006.01)

(52) U.S. Cl.
CPC *H04L 67/10* (2013.01); *G06F 8/63* (2013.01); *G06F 9/4843* (2013.01); *H04L 67/148* (2013.01); *G06F 8/61* (2013.01); *H04L 67/1097* (2013.01)

(58) Field of Classification Search
CPC .............. G06F 8/61; G06F 8/63; H04I 67/10; H04L 67/1097
USPC .................. 709/217–219, 201–205
See application file for complete search history.

(56) References Cited

U.S. PATENT DOCUMENTS

| | | | |
|---|---|---|---|
| 7,272,788 B2* | 9/2007 | Anderson et al. | 709/219 |
| 7,548,949 B2* | 6/2009 | Anderson | 709/217 |
| 8,694,465 B2* | 4/2014 | O'Farrell et al. | 707/621 |
| 2010/0061250 A1* | 3/2010 | Nugent | 370/242 |
| 2012/0173673 A1* | 7/2012 | Dietrich et al. | 709/218 |

FOREIGN PATENT DOCUMENTS

WO    2010088437 A2    8/2010

OTHER PUBLICATIONS

International Search Report from corresponding International Application No. PCT/CN12/075284 mailed May 10, 2012.
"Mirgrating your Existing Applications to the AWS Cloud" J. Varia, Amazon Web Services, 2010.
"Migration to Multi-Image Cloud Templates" by B. Pfitzmann, et al., IBM Research Report, RC25138 (W1104-038) Apr. 11, 2011, Computer Science.
Amazon Elastic Compute Cloud (Amazon EC2), http://aws.amazon.com/ec2, 16 pages.
http://code.google.com/appengine. 2013.

* cited by examiner

*Primary Examiner* — Bharat N Barot
(74) *Attorney, Agent, or Firm* — Brundidge & Stanger, P.C.

(57) ABSTRACT

In some examples, a method for rebuilding a source provider service environment in a target provider environment is described. The method may include identifying, using a service meta-app describing a service in a source provider environment, an internal direct dependency of the service. The method may also include accessing a dependency meta-app describing the internal direct dependency. The method may also include building the internal direct dependency according to the dependency meta-app in a target provider environment. The method may also include fetching an image of the service. The method may also include installing the image of the service in the target provider environment. The method may also include configuring the installed image of the service to depend from the internal direct dependency according to the service meta-app.

27 Claims, 5 Drawing Sheets

```
                                                    ┌─ 300A
                                    ┌─ 308
              <xml.... >
              <main name="myapp">
      ┌   <!-- self ref -->      ┌─ 312
      │       <ref link=http://... />  ┌─ 310
 302A ┤       <image link=http://... />           ┌─ 314
      │       <start paramName="config1", value="" />  ◄
 304A ┤       <start paramName="num", value="1" />  ◄
      │       <start paramName="loop", value="2" />  ◄
      └
      ┌       <!—all direct dependencies -->
      │       <dependencies>     ┌─ 316
      │           <item name="">
 306A ┤                           ┌─ 318
      │           <ref link="http://">
      │           <!—This image meta app link -->
      │           </item>...
      └       </dependencies>
              </main>
              </xml>
                    FIG. 3B
```

```
                                         ┌─ 300B
                          ┌─ 320
              <xml.... >
              <main name="container">
                                ┌─ 324
      ┌   <!-- self ref -->           ┌─ 322
      │       <ref link=http://.../>
 302B ┤       <image link=http://labs.renren.com/apache-mirror//httpd/httpd-
      │       2.0.64.tar.bz2 />
      │                                              ┌─ 326
      │       <build src="/path/to/build/shell/build.sh" />  ◄
 304B ┤       <configuration src="/path/to/configuration/configure.sh" />  ◄
      │       <start src="/path/to/run/startup.sh" />  ◄
      └
      ┌       <!—all direct dependencies -->
      │       <dependencies>      ┌─ 328        ┌─ 330
      │           <item name="g++">
 306B ┤           <ref link="http://another/meta-app path/g++/compiler" />
      │           </item>...
      └       </dependencies>
              </main>
              </xml>
                    FIG. 3C
```

META-APP TO DEPICT CLOUD ENVIRONMENT DEPENDENCIES TO FACILIATE A SERVICE ENVIRONMENT REBUILD

CROSS-REFERENCE TO RELATED APPLICATION

This Application is the National Stage filing under 35 U.S.C. §371 of PCT Application Ser. No. PCT/CN12/75284 filed on May 10, 2012. The disclosure of the PCT Application is hereby incorporated herein by reference in its entirety.

BACKGROUND

Unless otherwise indicated herein, the materials described herein are not prior art to the claims in the present application and are not admitted to be prior art by inclusion in this section.

Cloud computing has become popular in recent years. Cloud computing generally involves executing applications on general purpose servers in a computing environment that is remote from corresponding users of the applications.

There are various cloud computing providers. Different providers often have different provider environments, including different Application Programming Interfaces (APIs) and/or infrastructures. For some applications, one provider environment may be incompatible with another provider environment.

Some users may wish to migrate an application from a source provider environment of a source cloud to a different target provider environment of a target cloud. The differences between the source provider environment and the target provider environment may be so substantial that a user may have to substantially rebuild a corresponding application in the target provider environment to migrate the application to the target provider environment. Difficulties associated with rebuilding the application or otherwise migrating the application due to compatibility issues between the source and target provider environments may dissuade the user from migrating the application to the target provider environment even though it might otherwise be beneficial, e.g., in terms of cost and/or performance, to the user to migrate the application to the target provider environment.

SUMMARY

Technologies described herein generally relate to migrating services between potentially incompatible source and target provider environments.

In some examples, a method for rebuilding a source provider service environment in a target provider environment is described. The method may include identifying, using a service meta-app describing a service in a source provider environment, an internal direct dependency of the service. The method may also include accessing a dependency meta-app describing the internal direct dependency. The method may also include building the internal direct dependency according to the dependency meta-app in a target provider environment. The method may also include fetching an image of the service. The method may also include installing the image of the service in the target provider environment. The method may also include configuring the installed image of the service to depend from the internal direct dependency according to the service meta-app.

In some examples, a computer-readable storage medium having computer-readable instructions stored thereon that are executable by a computing device to perform operations is described. The operations may include identifying, using a service meta-app describing a service in a source provider environment, an internal direct dependency of the service. The operations may also include accessing a dependency meta-app describing the internal direct dependency. The operations may also include building the internal direct dependency according to the dependency meta-app in a target provider environment. The operations may also include fetching an image of the service. The operations may also include installing the image of the service in the target provider environment. The operations may also include configuring the installed image of the service to depend from the internal direct dependency according to the service meta-app.

In some examples, a system includes a processing device and a computer-readable storage medium having a rebuild agent stored thereon. The rebuild agent includes computer-readable instructions that are executable by the processing device to perform operations. The operations may include identifying, using a service meta-app describing a service in a source provider environment, an internal direct dependency of the service. The operations may also include accessing a dependency meta-app describing the internal direct dependency. The operations may also include building the internal direct dependency according to the dependency meta-app in a target provider environment. The operations may also include fetching an image of the service. The operations may also include installing the image of the service in the target provider environment. The operations may also include configuring the installed image of the service to depend from the internal direct dependency according to the service meta-app.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the drawings:

FIG. 3B illustrates an example service meta-app that may correspond to the meta-app of FIG. 3A;

FIG. 3C illustrates an example dependency meta-app that may correspond to the meta-app of FIG. 3A;

DETAILED DESCRIPTION

Figure 1:
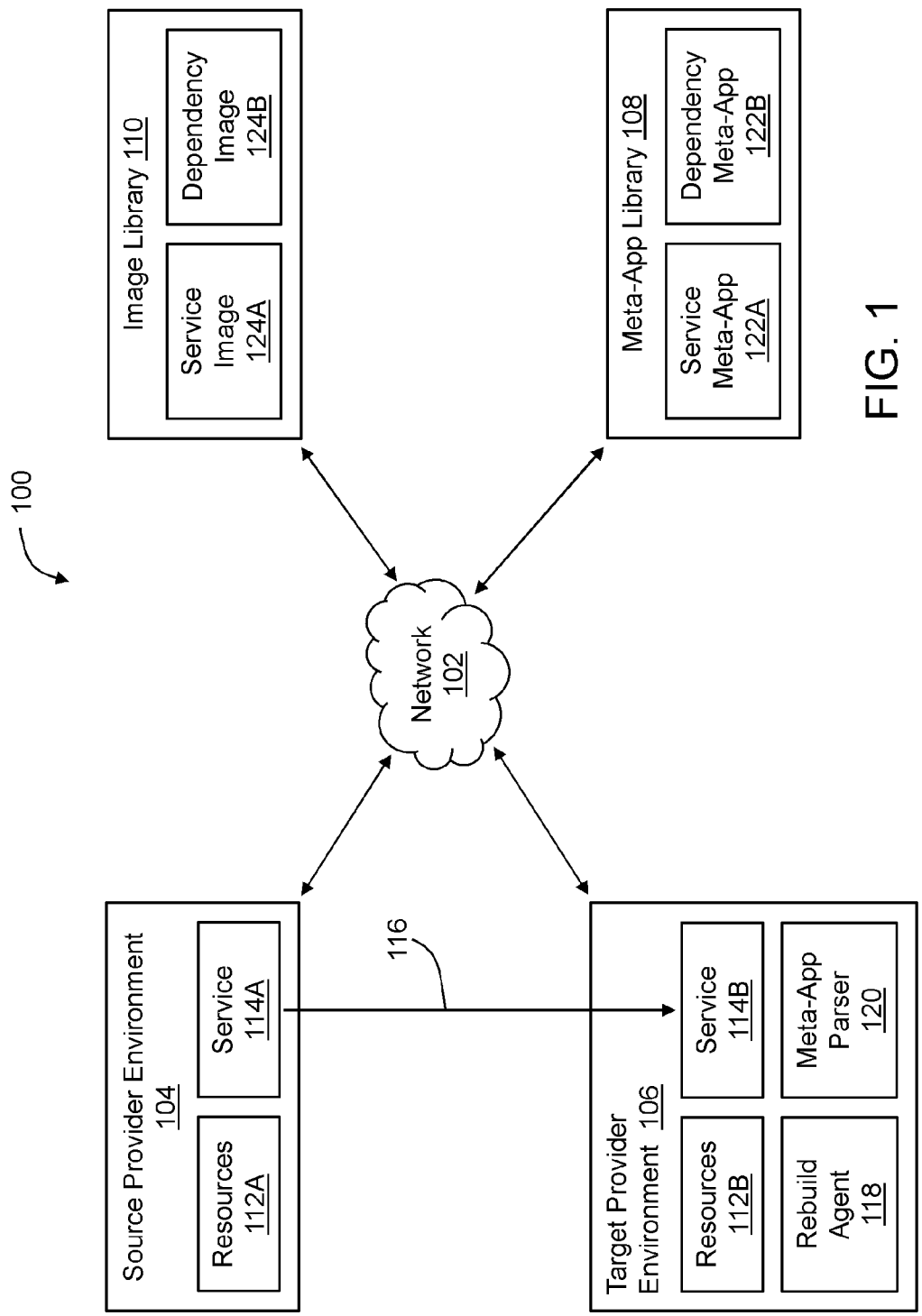
FIG. 1 is a block diagram of an example operating environment in which a service may be migrated from a source provider environment to a target provider environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein generally relate to migrating services between potentially incompatible source and target provider environments. A service meta-app describing a service may be provided in advance of migrating the service. For example, the service meta-app may identify one or more internal direct dependencies of the service and/or an environmental context and configuration of the service. Dependency meta-apps describing the internal direct dependencies of the service may also be provided in advance of the migration.

A rebuild agent in or associated with the target provider environment may use the service meta-app to identify the internal direct dependencies and the environmental context and configuration of the service, to fetch dependency meta-apps corresponding to the identified internal direct dependencies, and to fetch an image of the service. The rebuild agent may then build the internal direct dependencies according to the dependency meta-apps and configure the image of the service according to the service meta-app.

FIG. 1 is a block diagram of an example operating environment 100 in which a service may be migrated from a source provider environment to a target provider environment, arranged in accordance with at least some embodiments described herein. In the illustrated embodiment, the operating environment 100 includes a network 102, a source provider environment 104, a target provider environment 106, a meta-app library 108, and an image library 110.

In general, the network 102 may include one or more wide area networks (WANs) and/or local area networks (LANs) that enable communication between the source provider environment 104, the target provider environment 106, the meta-app library 108 and/or the image library 110. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The source provider environment 104 may include a cloud computing environment including resources 112A and one or more services 114A owned by users of or associated with the users of the source provider environment 104.

By way of example, and not limitation, the resources 112A may include processing resources such as one or more central processing units (CPUs), storage resources such as one or more storage devices, other resources such as network interface controllers (NICs) or other communication interface devices, and/or other suitable computer resources.

The service 114A may be run on the resources 112A of the source provider environment 104. In some embodiments, the service 114A may include a specific version of particular software. The service 114A may include, but is not limited to, a web server, an application server, or a database instance. More specific examples of the service 114A may include, but are not limited to, a C++-based application, a PHP: Hypertext Preprocessor (PHP)-based application, a My Structured Query Language (MySQL) server database, or the like or any combination thereof. The service 114A may be configured to serve requests from client devices (not shown) configured to communicate with the service 114 via the network 102.

The service 114A may have, within the source provider environment 104, a service environment including, for instance, one or more internal direct dependencies and/or an environmental context and configuration. The service environment of the service 114A within the source provider environment 104 may be referred to herein as the "source provider service environment."

The owner or other user associated with the service 114A may desire to migrate the service 114A from the source provider environment 104 to another provider environment, such as the target provider environment 106. For instance, if the target provider environment 106 provides similar or better offerings for about the same or less money than the source provider environment 104, or for any other reason, the owner or other user associated with the service 114A may desire to migrate the service 114A to the target provider environment 106, as denoted at 116.

Similar to the source provider environment 104, the target provider environment 106 may include a cloud computing environment including resources 112B. The resources 112B may include processing resources, storage resources, and/or other suitable computer resources.

The target provider environment 106 may additionally include a service 114B. The service 114B may include an instance in the target provider environment 106 of the service 114A from the source provider environment 104. Although the target provider environment 106 includes a single service 114B in the illustrated embodiment, more generally the target provider environment 106 may include any number of services, some of which may have been migrated to the target provider environment 106 from other provider environments such as the source provider environment 104.

The target provider environment 106 may additionally include or may have associated therewith a rebuild agent 118. The rebuild agent 118 may generally be configured to rebuild the source provider service environment of the service 114A for the service 114B within the target provider environment 106 according to information included in a meta-app of the service 114A. In some embodiments, the rebuild agent 118 may be stored on a computer-readable storage medium of the resources 112B as computer-readable instructions that are executable by a processing device of the resources 112B to rebuild the source provider service environment and/or perform other operations described herein.

Optionally, the target provider environment 106 may further include a meta-app parser 120. The meta-app parser 120 may be configured to parse meta-apps to extract information therefrom which may be used by the rebuild agent 118 to rebuild source provider service environments of services within the target provider environment 106.

The meta-app library 108 may include one or more meta-apps 122A, 122B, hereinafter collectively "meta-apps 122." In general, each of the meta-apps 122 may describe a service or a dependency of a service. Each of the meta-apps 122 that describes a corresponding service may be referred to herein as a "service meta-app" 122A while each of the meta-apps 122 that describes a corresponding dependency of a service may be referred to herein as a "dependency meta-app" 122B. While FIG. 1 illustrates the meta-app library 108 as including a single service meta-app 122A and a single dependency meta-app 122B, the meta-app library 108 may more generally include any number of service meta-apps 122A and any number of dependency meta-apps 122B.

Each of the meta-apps 122 in the meta-app library 108 may include a pointer, such as a Uniform Resource Locator (URL), Uniform Resource Identifier (URI), or suitable other pointer, to a location of a corresponding image in the image library 110 or other location. Alternately or additionally, each of the service meta-apps 122A may include a pointer to a location of a corresponding dependency meta-app 122B in the meta-app library 108 or other location.

The image library 110 may include one or more images 124A, 124B, hereinafter collectively "images 124." Each of the images 124 may include an image of a service or an image of a dependency of a service. Each of the images 124 that includes an image of a service may be referred to herein as a "service image" 124A while each of the images 124 that includes an image of a dependency of a service may be referred to herein as a "dependency image" 124B. While FIG. 1 illustrates the image library 110 as including a single service image 124A and a single dependency image 124B, the image library 110 may more generally include any number of service images 124A and any number of dependency images 124B.

In some embodiments, one or both of the meta-app library 108 and/or the image library 110 may be included in or may be associated with the source provider environment 104. Alternately or additionally, one or both of the meta-app library 108 and/or the image library 110 may be included in or may be associated with the target provider environment 106. Alternately or additionally, one or both of the meta-app library 108 and/or the image library 110 may be included in or may be associated with a third party provider.

In operation, and prior to migration 116 of the service 114A to the target provider environment 106, a service meta-app describing the service 114A may be built and stored in the meta-app library 108 as the service meta-app 122A. The service meta-app 122A may be built, for example, by the owner or other user associated with the service 114A. Alternately or additionally, the service meta-app 122A may be built, at least in part, by an automated discovery process or by some other user, whether associated with the service 114A or not.

The service meta-app 122A may include a pointer to an image of the service 114A, which may be stored in the image library 110 as the service image 124A.

The service 114A may include at least one internal direct dependency in the source provider environment 104. For instance, the service 114A may include a C++-based application, in which case the service 114A may include at least one internal direct dependency including a C++ library or multiple C++ libraries. As another example, the service 114A may include a web server including a PHP-based application and/or a MySQL server database, in which case the service 114A may include multiple internal direct dependencies including a Zend PUP framework, an Apache web services framework, or a PHP engine. Thus, the service 114A may include at least one internal direct dependency including, but not limited to, a C++ library, an operating system, a Zend PHP framework, an Apache web services framework, or a PHP engine.

A dependency meta-app describing the dependency may be built and stored in the meta-app library 108 as the dependency meta-app 122B. Similar to the service meta-app 122A, the dependency meta-app 122B may be built, in whole or in part, by the owner or other user associated with the service 114A or by an automated discovery process or some other user.

The service meta-app 122A may include a pointer to the dependency meta-app 122B. The dependency meta-app 122B may include a pointer to an image of the dependency, which may be stored in the image library 110 as the dependency image 124B.

After the owner or other user associated with the service 114A is ready to migrate the service 114A to the target provider environment 106, the service meta-app 122A may be provided to the target provider environment 106, or more particularly to the rebuild agent 118. In some embodiments, providing the service meta-app 122A to the rebuild agent 118 may include providing a pointer to the service meta-app 122A in the meta-app library 108 to the rebuild agent 118. In response to receiving the pointer, the rebuild agent 118 may retrieve the service meta-app 122A from the indicated location.

The rebuild agent 118 may use the service meta-app 122A to rebuild the source provider service environment in the target provider environment 106. For example, in these and other embodiments, the rebuild agent 118 may generally analyze the service meta-app 122A to identify internal dependencies and configurations and environmental context and configurations of the service 114A. The identified information may then be used by the rebuild agent 118 to fetch the service image 124A, any of the dependency images 124B corresponding to internal dependencies of the service 114A and to provide the service image 124A with the identified environmental context and configuration. The configured service image 124A may then be started up in the target provider environment 106 as the service 114B.

Some service migration procedures may implement a time- and/or resource-intensive graph-matching algorithm to find a best match image having a structure that is close to the structure of an image of the service 114A in the source provider environment 104. In contrast, some embodiments described herein can identify and locate a particular image of the service 114A, e.g., the service image 124A, using the pointer in the corresponding service meta-app 122A, without performing a time- and/or resource-intensive matching algorithm.

Additionally, some services, such as C++-based applications, may experience compilation errors or execution errors if not configured in a target provider environment with the same internal direct dependencies, such as C++ libraries, as in a source provider environment. Whereas some service migration procedures implement approximate image matching, e.g., for the service and/or its internal direct dependencies, such service migration procedures may be unsuitable where proper compilation and/or execution of the service depends on a substantially identical match. Some embodiments described herein, however, include configuring the service image 124A with the same internal direct dependencies in the target provider environment 106 as in the source provider environment 104. Some embodiments described herein can dispense with approximate image matching as pointers to particular images can be provided. In particular, pointers in the service meta-app 122A and any corresponding dependency meta-apps may allow configuring the service image 124A, and thus the service 114B, with substantially identical internal direct dependencies in the target provider environment 106 as in the service provider environment 104.

Figure 2:
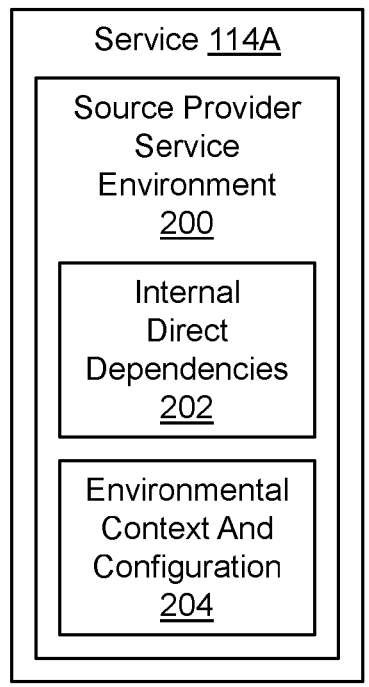
FIG. 2 is a block diagram of an example embodiment of the service of FIG. 1.

FIG. 2 is a block diagram of an example embodiment of the service 114A of FIG. 1, arranged in accordance with at least some embodiments described herein. The service 114A may have a source provider service environment 200 including one or more internal direct dependencies 202 and an environmental context and configuration 204.

As previously mentioned, each of the internal direct dependencies may include, but is not limited to, a C++ library, an operating system, a Zend PHP framework, an Apache web services framework, or a PHP engine.

The environmental context and configuration 204 may generally include configurations for launching the service 114A. In more detail, the environmental context and configuration 204 may include, but is not limited to, a runtime database source configuration, an external server dependency, an external network dependency, configuration files, a deploy shell of an image of the service 114A, a startup shell of the image of the service 114A, or a system environment of the service 114A.

An internal direct dependency of a service may include a source provider dependency environment similar to the source provider service environment 200 of FIG. 2. For example, the source provider dependency environment of a particular internal direct dependency may include one or more internal direct dependencies and an environmental context and configuration of the particular internal direct dependency.

Figure 3A:
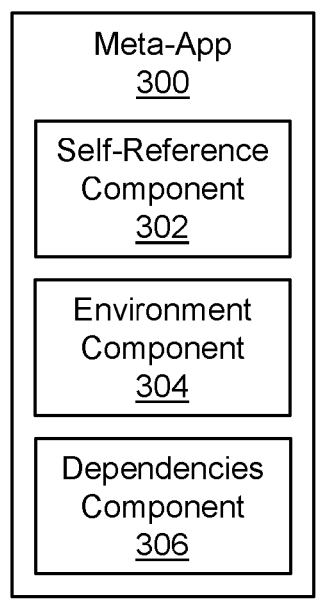
FIG. 3A is a block diagram of an example meta-app that may be implemented in the operating environment of FIG. 1.

FIG. 3A is a block diagram of an example meta-app 300 that may be implemented in the operating environment of FIG. 1, arranged in accordance with at least some embodiments described herein. The meta-app 300 may correspond to the service meta-app 122A or the dependency meta-app 122B of FIG. 1. The meta-app 300 may describe a service in a source provider environment in which case it may be referred to as a service meta-app, or it may describe an internal direct dependency of a service in which case it may be referred to as a dependency meta-app.

In the illustrated embodiment, the meta-app 300 includes a self-reference component 302, an environment component 304 and a dependencies component 306.

The self-reference component 302 generally includes information about the meta-app 300. For example, the self-reference component 302 may identify a version of the meta-app 300 and/or may include plain text identifying an owner of the meta-app 300 and/or a modification history of the meta-app 300. Alternately or additionally, the self-reference component 302 may specify a location of the meta-app 300 itself and/or an image of a corresponding service or internal direct dependency described by the meta-app 300 by, e.g., including a pointer to the meta-app 300 itself and/or a pointer to the image. The specified location of the image may include a location in an image library, such as the image library 110 of FIG. 1, and/or the specified location of the meta-app 300 may include a location in a meta-app library, such as the meta-app library 108 of FIG. 1.

The environment component 304 may include parameters corresponding to configurations for launching the service or internal direct dependency described by the meta-app 300. For example, if the service described by the meta-app 300 includes the service 114A, the environment component 304 may include parameters of the environmental context and configuration 204 of FIG. 2. In operation, an installed image of a service or internal direct dependency described by the meta-app 300 may be configured according to the parameters in the environment component 304 describing configurations of the service or internal direct dependency. The configurations of the service or internal direct dependency may specify at least one of a runtime database source configuration, an external server dependency, an external network dependency, a deploy shell of an image of the service or internal direct dependency, a startup shell of the image, or a system environment of the service or internal direct dependency.

The dependencies component 306 may include a list of or may otherwise identify one or more internal direct dependencies of the corresponding service or internal direct dependency described by the meta-app 300. For example, if the service described by the meta-app 300 includes the service 114A, the dependencies component 306 may include a list of the one or more internal direct dependencies 202 of the service 114A of FIG. 2. Alternately or additionally, the dependencies component 306 may specify, for each of the internal direct dependencies identified in the dependencies component 306, a location of a dependency meta-app describing the corresponding internal direct dependency. For instance, the dependencies component 306 may include one or more pointers to one or more corresponding dependency meta-apps in a meta-app library, such as the meta-app library 108 of FIG. 1.

In some embodiments, the meta-app 300 may be defined in an eXtensible Markup Language (XML) format or other suitable format.

FIG. 3B illustrates an example service meta-app 300A that may correspond to the meta-app 300 of FIG. 3A, arranged in accordance with at least some embodiments described herein. In the illustrated embodiment, the service meta-app 300A is defined in XML format and includes a self-reference component 302A, an environment component 304A and a dependencies component 306A. In some embodiments, the service meta-app 300A may additionally include a name of or otherwise identify a particular service 308 described by the service meta-app 300A.

The self-reference component 302A may include a pointer 310 to an image of the service 308. The pointer 310 may specify a location of the image of the service 308 and/or may be used by a rebuild agent to fetch the image of the service 308 while rebuilding a corresponding source provider service environment.

The self-reference component 302A may additionally include a pointer 312 to the service meta-app 300A itself. The pointer 312 may specify a location of the service meta-app 300A in a meta-app library, such as the meta-app library 108 of FIG. 1.

The environment component 304A may include various parameters 314 describing an external context and configurations of the service 308 that may be used for launching the service 308 in a target provider environment.

In some embodiments, the dependencies component 306A may include a name of or may otherwise identify a particular internal direct dependency 316 of the service 308. Although a single internal direct dependency 316 is illustrated in FIG. 3B, more generally the service meta-app 300A may include one or more internal direct dependencies 316. Alternately or additionally, the dependencies component 306A may include a pointer 318 to a dependent meta-app corresponding to the internal direct dependency 316. The pointer 318 may specify a location of the dependency meta-app in a meta-app library, such as the meta-app library 108 of FIG. 1.

FIG. 3C illustrates an example dependency meta-app 300B that may correspond to the meta-app 300 of FIG. 3A, arranged in accordance with at least some embodiments described herein. In the illustrated embodiment, the dependency meta-app 300B is defined in XML format and includes a self-reference component 302B, an environment component 304B and a dependencies component 306B. In some embodiments, the dependency meta-app 300B may additionally include a name of or otherwise identify a particular internal direct dependency 320 described by the dependency meta-app 300B. The internal direct dependency 320 may include an Apache web services framework in the illustrated embodiment.

The self-reference component 302B may include a pointer 322 to an image of the internal direct dependency 320. The pointer 322 may specify a location of the image of the internal direct dependency 320 and/or may be used by a rebuild agent to fetch the image of the internal direct dependency 320 while rebuilding a corresponding source provider service environment of a service that depends from the internal direct dependency 320.

The self-reference component 302B may additionally include a pointer 324 to the dependency meta-app 300B itself. The pointer 324 may specify a location of the dependency meta-app 300B in a meta-app library, such as the meta-app library 108 of FIG. 1.

The environment component 304B may include various parameters 326 describing an external context and configurations of the internal direct dependency 320 that may be used for launching the internal direct dependency 320 in a target provider environment.

In some embodiments, the dependencies component 306B may include a name of or may otherwise identify a particular internal direct dependency 328 of the internal direct dependency 320. Although a single internal direct dependency 328 is illustrated in FIG. 3C, more generally the dependency meta-app 300B may include one or more internal direct dependencies 328. Alternately or additionally, the dependencies component 306B may include a pointer 330 to a dependent meta-app corresponding to the internal direct dependency 328. The pointer 330 may specify a location of the dependency meta-app in a meta-app library, such as the meta-app library 108 of FIG. 1.

Table 1 includes a pseudocode representation of a rebuilding algorithm that may be implemented in a target provider environment, such as the target provider environment 106 of FIG. 1, to rebuild a source provider service environment when migrating a service from a source provider environment to a target provider environment, and that may generally be consistent with the preceding description.

TABLE 1

| | |
|---|---|
| 0: | Function buildAgent(MetaAppmetaApp){ |
| 1: | Obtain application meta-app M. |
| 2: | Obtain M's dependencies D and for each dependency in D; do |
| 3: | if dependency is not in agent; then |
| 4: | Fetch dependency's meta-app, named depMetaApp, from meta-app library |
| 5: | BuildAgent(DepMetaApp) |
| 6: | Fi |
| 7: | Fi |
| 8: | Fetch image from image library and install image |
| 9: | Configure/start image with parameters defined in meta-app |
| 10: | } |

According to some embodiments, and as represented by Table 1, the rebuilding algorithm may include identifying dependencies of the service from a corresponding service meta-app, fetching corresponding dependency meta-apps to build the dependencies, fetching an image of the service, and configuring the image of the service according to the service meta-app.

Figure 4:
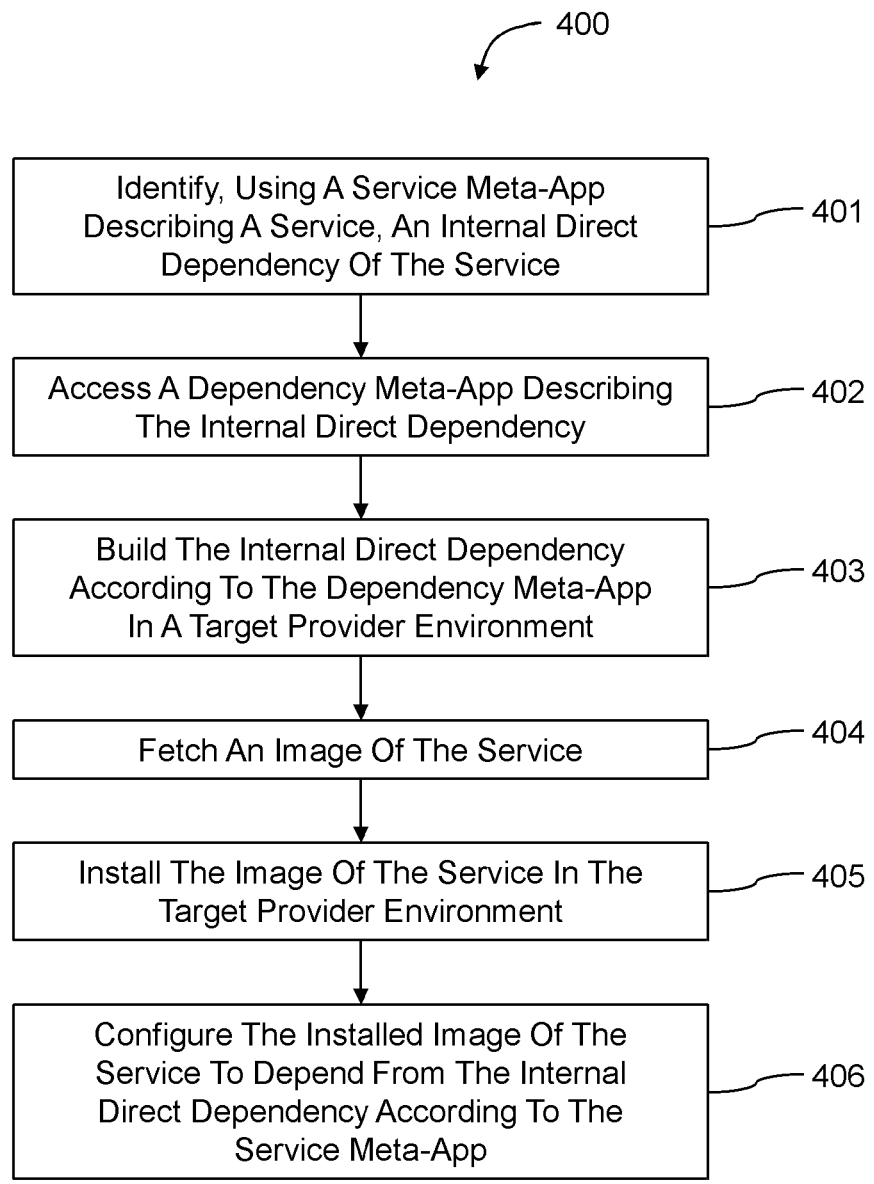
FIG. 4 shows a flow diagram of an example method for rebuilding a source provider service environment in a target provider environment.

FIG. 4 shows a flow diagram of an example method 400 for rebuilding a source provider service environment in a target provider environment, arranged in accordance with at least some embodiments described herein. The method 400 may be performed in whole or in part by, e.g., the target provider environment 106 of FIG. 1, or more particularly by the rebuild agent 118 and/or the meta-app parser 120. In some embodiments, the method 400 may involve the use of one or more meta-apps, such as the meta-apps 122, 300, 300A, 300B of FIGS. 1 and 3A-3C. The method 400 includes various operations, functions or actions as illustrated by one or more of blocks 401, 402, 403, 404, 405, and/or 406. The method 400 may begin at block 401.

In block 401 ("Identify, Using A Service Meta-App Describing A Service, An Internal Direct Dependency Of The Service"), an internal direct dependency of a service may be identified. The internal direct dependency of the service may be identified using a service meta-app describing the service in a source provider environment. Block 401 may be followed by block 402.

In block 402 ("Access A Dependency Meta-App Describing The Internal Direct Dependency"), a dependent meta-app describing the internal direct dependency may be accessed. Accessing the dependency meta-app may include fetching the dependency meta-app from a location in a library of meta-apps, such as a location in the meta-app library 108 of FIG. 1. The location may be specified in a dependencies component of the service meta-app. Block 402 may be followed by block 403.

In block 403 ("Build The Internal Direct Dependency According To The Dependency Meta-App In A Target Provider Environment"), the internal direct dependency may be built according to the dependency meta-app in a target provider environment, such as the target provider environment 106 of FIG. 1.

Building the internal direct dependency according to the dependency meta-app in the target provider environment may include fetching an image of the internal direct dependency, installing the image of the internal direct dependency, and configuring the installed image of the internal direct dependency according to the dependency meta-app. For instance, the dependency meta-app may include a pointer to the image of the internal direct dependency in a particular location, such as a location of the image library 110 of FIG. 1. The pointer may be used to fetch the image from the location and the image may then be installed in the target provider environment. The installed image may be configured according to a dependencies component and/or an environment component of the dependency meta-app, for example. Block 403 may be followed by block 404.

In block 404 ("Fetch An Image Of The Service"), an image of the service may be fetched. Fetching an image of the service may include fetching the image of the service from a location in a library of images, such as the image library 110 of FIG. 1. The location may be specified in a self-reference component of the service meta-app. Block 404 may be followed by block 405.

In block 405 ("Install The Image Of The Service In The Target Provider Environment"), the image of the service may be installed in the target provider environment. Block 405 may be followed by block 406.

In block 406 ("Configure The Installed Image Of The Service To Depend From The Internal Direct Dependency According To The Service Meta-App"), the installed image of the service may be configured to depend from the internal direct dependency according to the service meta-app describing the service in the source provider environment.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 400 may include receiving the service meta-app from an owner of the service. Alternately or additionally, a pointer to the service meta-app in a library of meta-apps, such as the meta-app library 108 of FIG. 1, may be received from the owner and the pointer may be used to fetch the service meta-app. In these and other embodiments, the service meta-app may be built by at least one of the owner of the service, a user otherwise associated with the service, or a user not associated with the service. Alternately or additionally, the service meta-app may be built, at least in part, by an automated discovery process.

Alternately or additionally, the method 400 may include configuring the installed image of the service according to one or more parameters in an environment component of the service meta-app. The environment component may describe configurations of the service. The configurations of the service may specify at least one of a runtime database source configuration, an external server dependency, an external network dependency, a deploy shell of the image of the service, a startup shell of the image of the service, or a system environment of the service.

In some embodiments, the method 400 may include, prior to identifying the internal direct dependency of the service, parsing the service meta-app to extract therefrom internal dependencies and configurations of the service. For instance, the meta-app parser 120 of FIG. 1 may perform the parsing and may extract the internal dependencies and configurations of the service from, respectively, a dependencies component and an environment component of the service.

Although not required, the dependencies component of the service meta-app may specify multiple internal direct dependencies of the service and the installed image of the service may be configured to depend from all of the internal direct dependencies. In these and other embodiments, the method 400 may include iterating as follows for each of the internal direct dependencies. A dependency meta-app describing the internal direct dependency may be accessed by fetching the dependency meta-app from a meta-app library when the internal direct dependency is not stored locally to a rebuild agent performing the iteration. The internal direct dependency may then be built based on the dependency meta-app, which may include fetching an image of the internal direct dependency from a location specified in the dependency meta-app and installing the image of the internal direct dependency in the target provider environment.

Alternately or additionally, the method 400 may include starting the service in the target provider environment from the installed and configured image of the service.

Some embodiments disclosed herein include a computer-readable storage medium having computer-readable instructions stored thereon that are executable by a computing device to perform operations included in the method 400 of FIG. 4, such as the operations illustrated by one or more of blocks 401-406 in FIG. 4, and/or variations thereof. The computer-readable storage medium may be included in the resources 112B of FIG. 1. Alternately or additionally, the computing device that performs the operations may be included in the resources 112B of FIG. 1.

Figure 5:
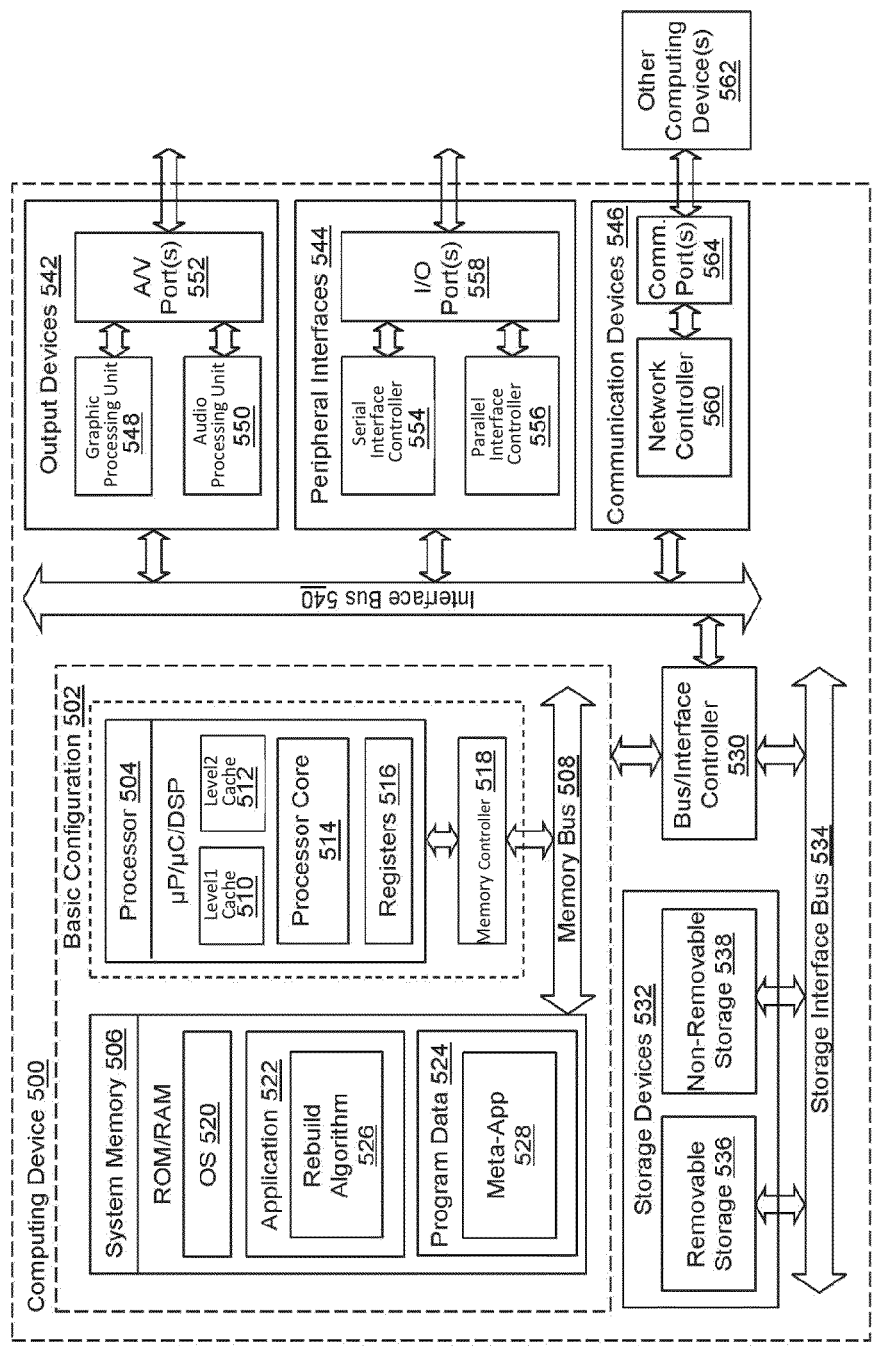
FIG. 5 is a block diagram illustrating an example computing device that is arranged for rebuilding a source provider service environment in a target provider environment, all arranged in accordance with at least some embodiments described herein.

FIG. 5 is a block diagram illustrating an example computing device 500 that is arranged for rebuilding a source provider service environment in a target provider environment, arranged in accordance with at least some embodiments described herein. The computing device 500 may be included in the resources 112B of FIG. 1, for example. In a very basic configuration 502, the computing device 500 typically includes one or more processors 504 and a system memory 506. A memory bus 508 may be used for communicating between the processor 504 and the system memory 506.

Depending on the desired configuration, the processor 504 may be of any type including but not limited to a microprocessor (µP), a microcontroller (µC), a digital signal processor (DSP), or any combination thereof. The processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an OS 520, one or more applications 522, and program data 524. The application 522 may include are build algorithm 526 that is arranged to perform the functions as described herein including those described with respect to the method 400 of FIG. 4. The application 522 may correspond to one or more of the rebuild agent 118 and/or the meta-app parser 120 of FIG. 4, for example. The program data 524 may include one or more meta-apps 528 that may be useful for rebuilding a source provider service environment in a target provider environment as is described herein. For instance, the one or more meta-apps 528 may include a service meta-app that can be used to rebuild a source provider service environment of a particular service in a target provider environment. In some embodiments, the application 522 may be arranged to operate with the program data 524 on the OS 520 such that methods for rebuilding a source provider service environment in a target provider environment such as the method 400 of FIG. 4 may be provided as described herein. This described basic configuration 502 is illustrated in FIG. 5 by those components within the inner dashed line.

The computing device 500 may have additional features or functionality, and additional interfaces to facilitate communications between the basic configuration 502 and any required devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., output devices 542, peripheral interfaces 544, and communication devices 546) to the basic configuration 502 via the bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 500 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to rebuild a source provider service environment in a target provider environment, the method comprising:
   identifying, by a computing device, using a service meta-app describing a service in a source provider environment, an internal direct dependency of the service;
   accessing, by the computing device, a dependency meta-app describing the internal direct dependency;
   building, by the computing device, the internal direct dependency according to the dependency meta-app in the target provider environment;
   fetching an image of the service;
   installing the image of the service in the target provider environment; and
   configuring the installed image of the service to depend from the internal direct dependency according to the service meta-app.

2. The method of claim 1, further comprising receiving the service meta-app from an owner of the service.

3. The method of claim 2, wherein the service meta-app is built by the owner of the service.

4. The method of claim 2, wherein the service meta-app is built, at least in part, by an automated discovery process.

5. The method of claim 1, wherein the building the internal direct dependency according to the dependency meta-app in the target provider environment includes:
   fetching an image of the internal direct dependency;
   installing the image of the internal direct dependency; and
   configuring the installed image of the internal direct dependency according to the dependency meta-app.

6. The method of claim 1, further comprising configuring the installed image of the service according to one or more parameters in an environment component of the service meta-app.

7. The method of claim 6, wherein the environment component of the service meta-app describes configurations of the service.

8. The method of claim 7, wherein the configurations of the service specify at least one of a runtime database source configuration, an external server dependency, an external network dependency, a deploy shell of the image of the service, a startup shell of the image of the service, or a system environment of the service.

9. The method of claim 1, wherein the image of the service comprises a specific version of particular software identified in the service meta-app.

10. The method of claim 1, wherein the accessing the dependency meta-app includes fetching the dependency meta-app from a location in a library of meta-apps, the location specified in a dependencies component of the service meta-app.

11. The method of claim 1, wherein the fetching an image of the service includes fetching the image of the service from a location in a library of images, the location specified in a self-reference component of the service meta-app.

12. The method of claim 1, wherein the service comprises at least one of: a web server, a C++-based application, a PHP-based application, or a MySQL server database.

13. The method of claim 12, wherein the internal direct dependency comprises at least one of: a C++ library, an operating system, a Zend PHP framework, an Apache web services framework, or a PHP engine.

14. The method of claim 1, further comprising, prior to identifying the internal direct dependency, parsing the service meta-app to extract therefrom internal dependencies and configurations of the service.

15. The method of claim 1, wherein the dependencies component specifies a plurality of internal direct dependencies of the service, the method further comprising iterating as follows for each of the plurality of internal direct dependencies:
   accessing the dependency meta-app describing the internal direct dependency by fetching the dependency meta-app from a meta-app library when the internal direct dependency is not stored locally to a rebuild agent performing the iteration; and
   building the internal direct dependency based on the dependency meta-app,
   wherein the installed image of the service is configured to depend from all of the plurality of internal direct dependencies.

16. The method of claim 1, further comprising starting the service in the target provider environment from the installed and configured image.

17. A non-transitory computer-readable storage medium having computer-readable instructions stored thereon that are executable by a computing device to perform operations comprising:
   identifying, using a service meta-app describing a service in a source provider environment, an internal direct dependency of the service;
   accessing a dependency meta-app describing the internal direct dependency;
   building the internal direct dependency according to the dependency meta-app in a target provider environment;
   fetching an image of the service;
   installing the image of the service in the target provider environment; and
   configuring the installed image of the service to depend from the internal direct dependency according to the service meta-app.

18. The computer-readable storage medium of claim 17, wherein the building the internal direct dependency according to the dependency meta-app in the target provider environment includes:
   fetching an image of the internal direct dependency;
   installing the image of the internal direct dependency; and
   configuring the installed image of the internal direct dependency according to the dependency meta-app.

19. The computer-readable storage medium of claim 17, the operations further comprising configuring the installed image of the service according to one or more parameters in an environment component of the meta-app.

20. The computer-readable storage medium of claim 19, wherein the environment component of the service meta-app describes external dependencies of the service.

21. The computer-readable storage medium of claim 17, wherein the image of the service comprises a specific version of particular software identified in the service meta-app.

22. A system comprising:
a processing device; and
a non-transitory computer-readable storage medium having a rebuild agent stored thereon, the rebuild agent comprising computer-readable instructions that are executable by the processing device to perform operations comprising:
identifying, using a service meta-app describing a service in a source provider environment, an internal direct dependency of the service;
accessing a dependency meta-app describing the internal direct dependency;
building the internal direct dependency according to the dependency meta-app in a target provider environment;
fetching an image of the service;
installing the image of the service in the target provider environment; and
configuring the installed image of the service to depend from the internal direct dependency according to the service meta-app.

23. The system of claim 22, further comprising:
an image library configured to be communicatively coupled to the processing device, the image library having stored therein the image of the service; and
a meta-app library configured to be communicatively coupled to the processing device, the meta-app library having stored therein the service meta-app and the dependency meta-app.

24. The system of claim 22, further comprising a meta-app parser stored on the computer-readable storage medium, the meta-app parser comprising computer-readable instructions that are executable by the processing device to perform operations comprising parsing the service meta-app to extract therefrom internal dependencies and configurations of the service.

25. The system of claim 22 wherein the service meta-app includes a self-reference component indicating an owner of the service meta-app and including a modification history of the service meta-app.

26. The system of claim 22, wherein a location of the dependency meta-app is specified by a Uniform Resource Identifier (URI) in a dependencies component of the service meta-app and a location of the image of the service is specified by a URI in a self-reference component of the service meta-app.

27. The system of claim 22, wherein the image of the service comprises a specific version of particular software identified in the service meta-app.

* * * * *

UNITED STATES PATENT AND TRADEMARK OFFICE
CERTIFICATE OF CORRECTION

| | |
|---|---|
| PATENT NO. | : 9,118,677 B2 |
| APPLICATION NO. | : 14/007547 |
| DATED | : August 25, 2015 |
| INVENTOR(S) | : Xu et al. |

Page 1 of 1

It is certified that error appears in the above-identified patent and that said Letters Patent is hereby corrected as shown below:

In the specification

In Column 1, Line 10, delete "§371" and insert -- § 371 --, therefor.

In Column 5, Line 55, delete "Zend PUP" and insert -- Zend PHP --, therefor.

Signed and Sealed this
Ninth Day of February, 2016

Michelle K. Lee
*Director of the United States Patent and Trademark Office*